(12) United States Patent
Seagle

(10) Patent No.: US 6,987,643 B1
(45) Date of Patent: Jan. 17, 2006

(54) POLE STRUCTURE TO RELIEVE ADJACENT TRACK WRITING

(75) Inventor: David John Seagle, Morgan Hill, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 103 days.

(21) Appl. No.: 10/056,936

(22) Filed: Oct. 23, 2001

(51) Int. Cl.
*G11B 5/23* (2006.01)

(52) U.S. Cl. ............................................. 360/119
(58) Field of Classification Search ........... 360/119, 360/126
See application file for complete search history.

(56) References Cited

U.S. PATENT DOCUMENTS

| | | | |
|---|---|---|---|
| 5,283,942 A * | 2/1994 | Chen et al. | 29/603.18 |
| 6,172,848 B1 * | 1/2001 | Santini | 360/126 |
| 6,317,289 B1 * | 11/2001 | Sasaki | 360/126 |
| 6,339,523 B1 * | 1/2002 | Santini | 360/317 |
| 6,339,524 B1 * | 1/2002 | Furusawa et al. | 360/317 |
| 6,339,872 B1 * | 1/2002 | Chang et al. | 29/603.14 |
| 6,353,995 B1 * | 3/2002 | Sasaki et al. | 29/603.14 |
| 6,430,806 B1 * | 8/2002 | Chen et al. | 29/603.07 |
| 6,557,242 B1 * | 5/2003 | Santini | 29/603.14 |

* cited by examiner

*Primary Examiner*—Brian E. Miller
(74) *Attorney, Agent, or Firm*—Sawyer Law Group LLP; Joshua C. Harrison, Esq.

(57) ABSTRACT

A method and system for providing a pedestal defined zero throat write head is disclosed. The method and system include providing a first pole having a pedestal, a second pole and a gap separating the pedestal of the first pole from a portion of the second pole. The pedestal has a front, a back and a notch. The gap has a first portion and a second portion. The first portion of the gap is in proximity to front of the pedestal. The second portion of the gap is in proximity to the back of the pedestal. The first portion of the gap is thinner than the second portion of the gap.

8 Claims, 10 Drawing Sheets

POLE STRUCTURE TO RELIEVE ADJACENT TRACK WRITING

FIELD OF THE INVENTION

The present invention relates to magnetic recording systems, and more particularly to a method and system for providing a pole structure which reduces writing of adjacent tracks.

BACKGROUND OF THE INVENTION

In order to write data to media, a write head is typically used. Such a write head is generally part of a merged head that includes a head for writing and a head for reading data from the media. FIGS. 1A and 1B depict side and perspective views, respectively, of a portion of a conventional insulation-defined zero-throat (IDZT) write head 10. The conventional IDZT head 10 includes a conventional first pole (P1) 12 and a conventional second pole (P2) 20 that are separated at the front, near the air bearing surface, by a conventional gap 18. Also shown is the hardbake layer 22 that is typically photoresist that is used to insulate the coils (not shown) of the conventional IDZT head 10. The conventional P1 12 includes a conventional pedestal 14 that has a conventional notch 16. The conventional notch 16 is typically formed by milling a portion of the pedestal 14. In forming the notch 16 using a conventional process, the hardbake 22 is used as a mask to shadow a portion of the conventional P1 12 from the ion mill. Thus, as can be seen in FIG. 1A, the hardbake layer 22 is relatively close to the front of the conventional IDZT head 10. The hardbake layer 22 thus overlaps a portion of the conventional pedestal 14. Because of the process used in its formation, the front 15 of the conventional notch 16 is thinner than the back 17 of the conventional notch 16.

Although the conventional IDZT head 10 functions, one of ordinary skill in the art will readily recognize that the writeability of the conventional IDZT head 10 can be improved. Furthermore, the track width, which is defined using the conventional notch 16 may be difficult to control.

FIGS. 2A and 2B depict side and perspective views, respectively, of a more recently developed pedestal-defined zero throat (PDZT) head 50. The more recently developed PDZT head 50 includes a conventional first pole (P1) 52 having a conventional pedestal 54, a conventional second pole (P2) 60 and a conventional gap 58 separating the conventional P1 52 from the conventional P2 60. The more recently developed PDZT head 50 also includes a hardbake layer 62 used to insulate coils (not shown). As can be seen in comparing FIG. 2A to FIG. 1A, the conventional hardbake layer 62 has been moved farther from the front of the more recently developed PDZT head 50. As a result, there is no overlap between the pedestal 54 and the hardbake layer 62.

The conventional pedestal 54 also includes a conventional notch 56 The conventional notch 56 is formed by using the conventional P2 60 as a mask to shadow the pedestal 54 during the milling process which forms the notch 56. Because the P2 60 is used as a mask, the ability of the more recently developed PDZT head 50 to write to a media is improved over that of the conventional PDZT head 10 depicted in FIGS. 1A and 1B. Referring back to FIGS. 2A and 2B, the process used for forming the notch 56 can also allow for greater control of the size of the notch 56 and, therefore, the track width.

Although the more recently developed PDZT head 50 functions, one of ordinary skill in the art will readily recognize that the more recently developed PDZT head 50 may inadvertently erase tracks adjacent to the track currently being written. FIGS. 3A and 3B depict portions of the more recently developed PDZT head 50 along with the magnetic field generated during use of the more recently developed PDZT head 50. As can be seen in FIGS. 3A and 3B, the magnetic flux generated between P1 52 and P2 60 includes gap flux in the gap 58 between the notch 56 and the P2 60 as well as a fringe flux at the edges of the pedestal 54 and the P2 60. This fringe flux includes flux at the back 57 of the notch 56, as shown in FIG. 3B. The combination of the fringe flux and the gap flux increase the magnetization of the pedestal 54 near the notch 56. In particular, the bottom of the notch 56 may become saturated. This can generate a longitudinal field (perpendicular to the plane of the page in FIG. 3B) at the front of the notch 56. This longitudinal field can inadvertently erase adjacent tracks.

Accordingly, what is needed is a system and method for reducing the tendency of a PDZT head to erase adjacent tracks while retaining writeability and track width control. The present invention addresses such a need.

SUMMARY OF THE INVENTION

The present invention provides a method and system for providing a pedestal defined zero throat write head. The method and system comprise providing a first pole having a pedestal, a second pole and a gap separating the pedestal of the first pole from a portion of the second pole. The pedestal has a front, a back and a notch. The gap has a first portion and a second portion. The first portion of the gap is in proximity to front of the pedestal. The second portion of the gap is in proximity to the back of the pedestal. The first portion of the gap is thinner than the second portion of the gap.

According to the system and method disclosed herein, the present invention provides a pedestal defined zero throat write head that is less likely to inadvertently write to adjacent tracks.

DETAILED DESCRIPTION OF THE INVENTION

The present invention relates to an improvement in write heads. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention provides a method and system for providing a pedestal defined zero throat write head. The method and system comprise providing a first pole having a pedestal, a second pole and a gap separating the pedestal of the first pole from a portion of the second pole. The pedestal has a front, a back and a notch. The gap has a first portion and a second portion. The first portion of the gap is in proximity to front of the pedestal. The second portion of the gap is in proximity to the back of the pedestal. The first portion of the gap is thinner than the second portion of the gap.

The present invention will be described in terms of a particular PDZT write head having certain dimensions. However, one of ordinary skill in the art will readily recognize that this method and system will operate effectively for other PDZT heads having portions of other sizes that are consistent with the present invention. The present invention will also be described in the context of a portion of a PDZT write head. However, one of ordinary skill in the art will readily recognize that the PDZT head is generally part of a merged head including both a write head and a read head. The present invention will also be described in the context of methods having particular steps. One of ordinary skill in the art will recognize, however, that for clarity, some steps have been omitted.

Figure 1A:
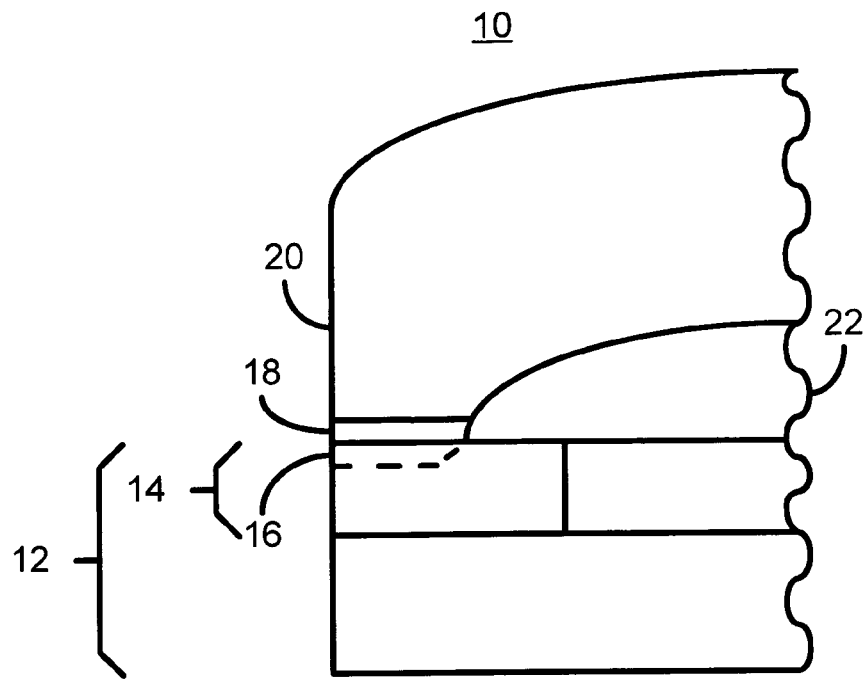
FIG. 1A is a side view of a portion of a conventional IDZT head that is formed using a hardbake to define the throat and the same hardbake as a mask to protect the back of the pedestal during milling.
Figure 1B:
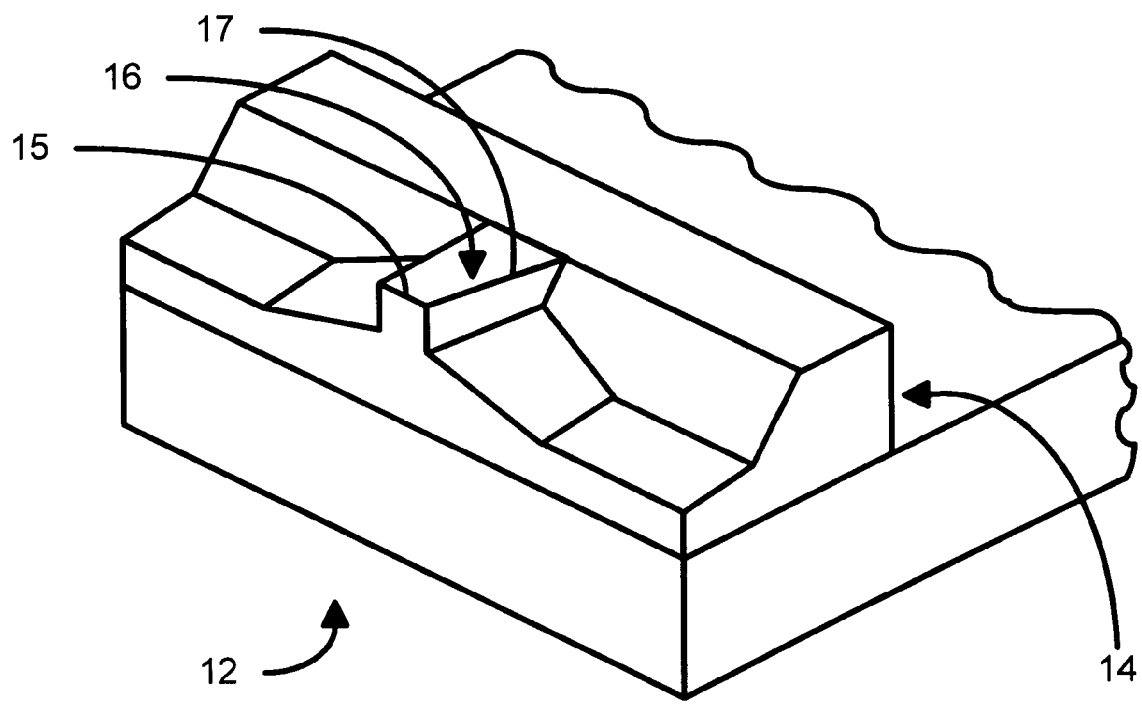
FIG. 1B is a perspective view of a portion of a conventional IDZT head of FIG. 1A.
Figure 2A:
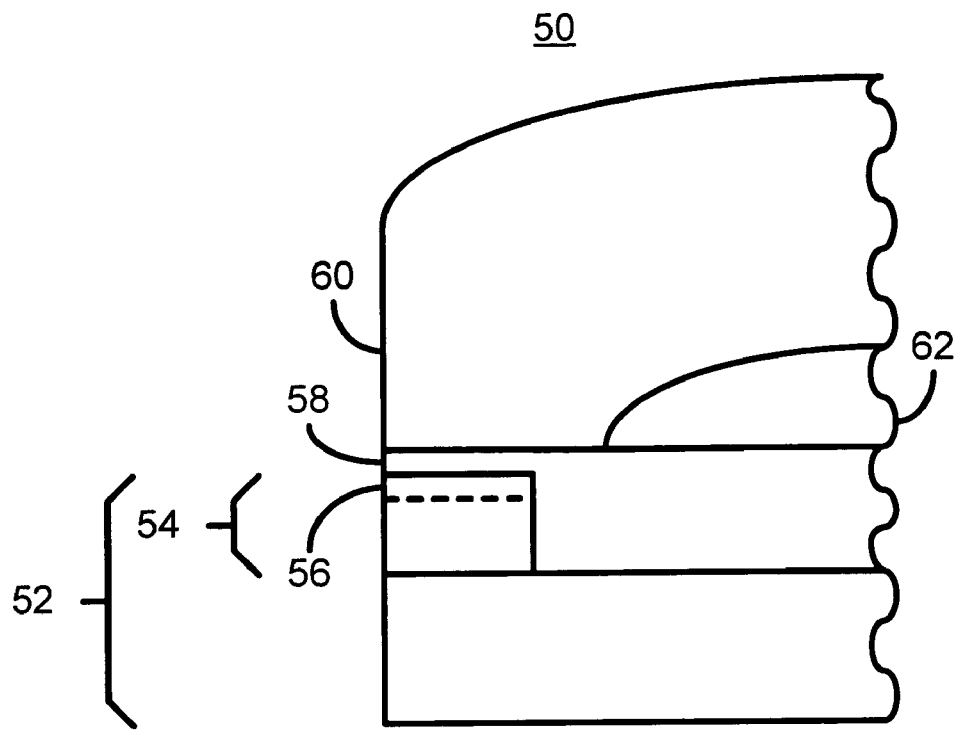
FIG. 2A is a side view of a portion of a more recently developed PDZT head that is formed using the second pole as a mask.
Figure 2B:
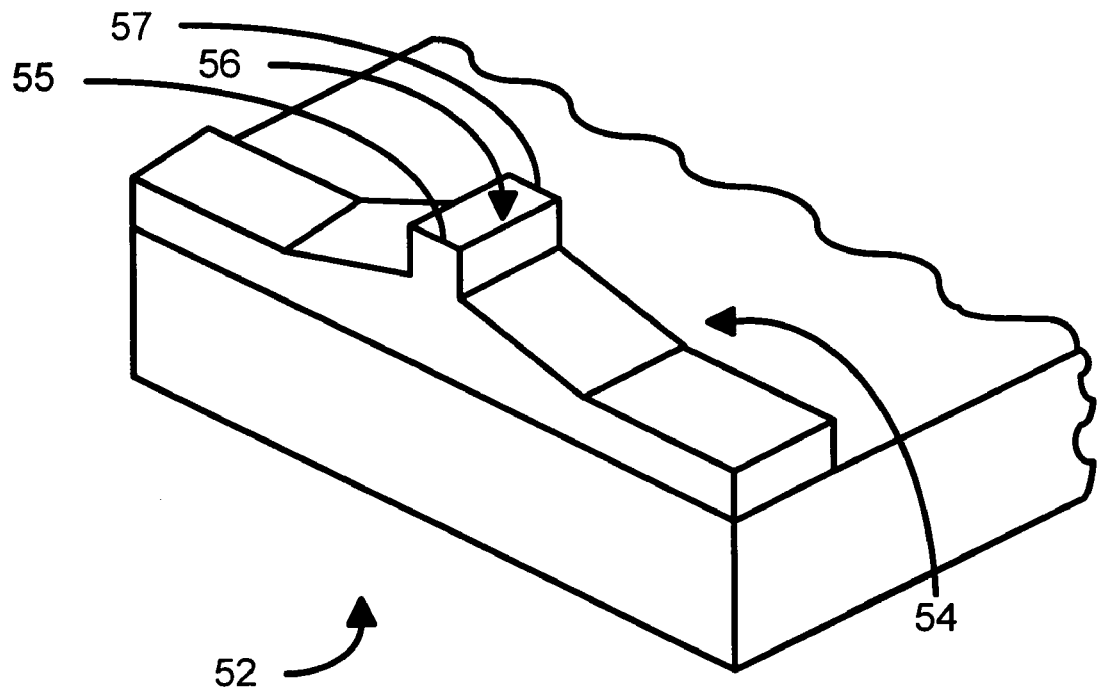
FIG. 2B is a perspective view of a portion of a more recently developed PDZT head that is formed using the second pole as a mask.
Figure 3A:
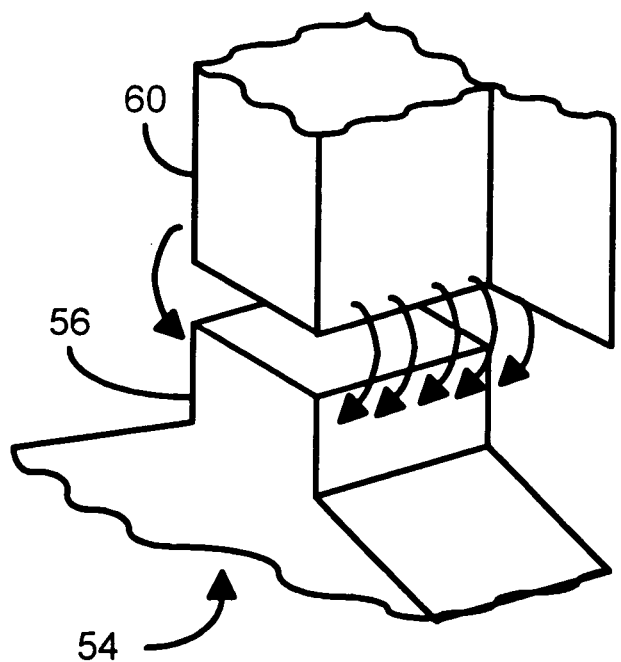
FIG. 3A is a perspective view of the magnetic field at a portion of the more recently developed PDZT head that is formed using the second pole as a mask.
Figure 3B:
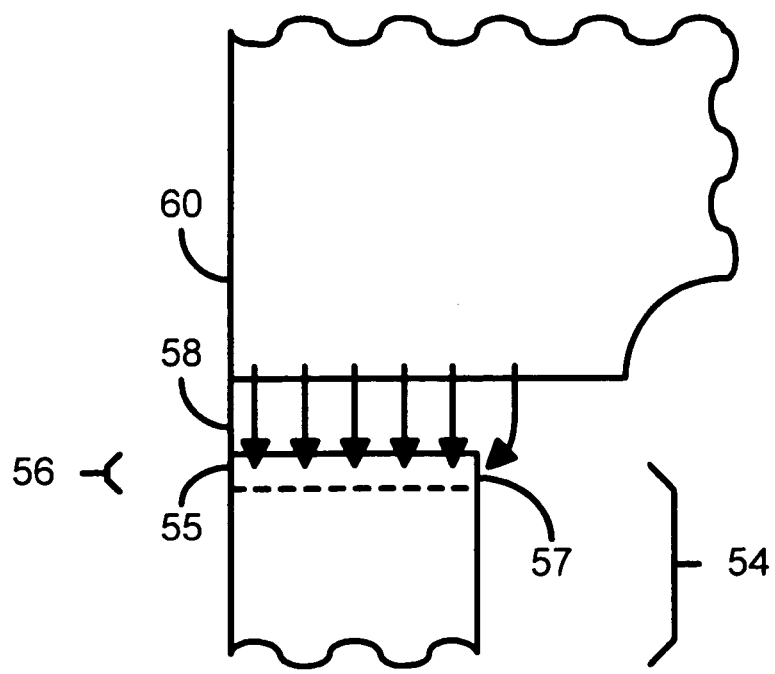
FIG. 3B is a side view of the magnetic field at a portion of the more recently developed PDZT head that is formed using the second pole as a mask.
Figure 4A:
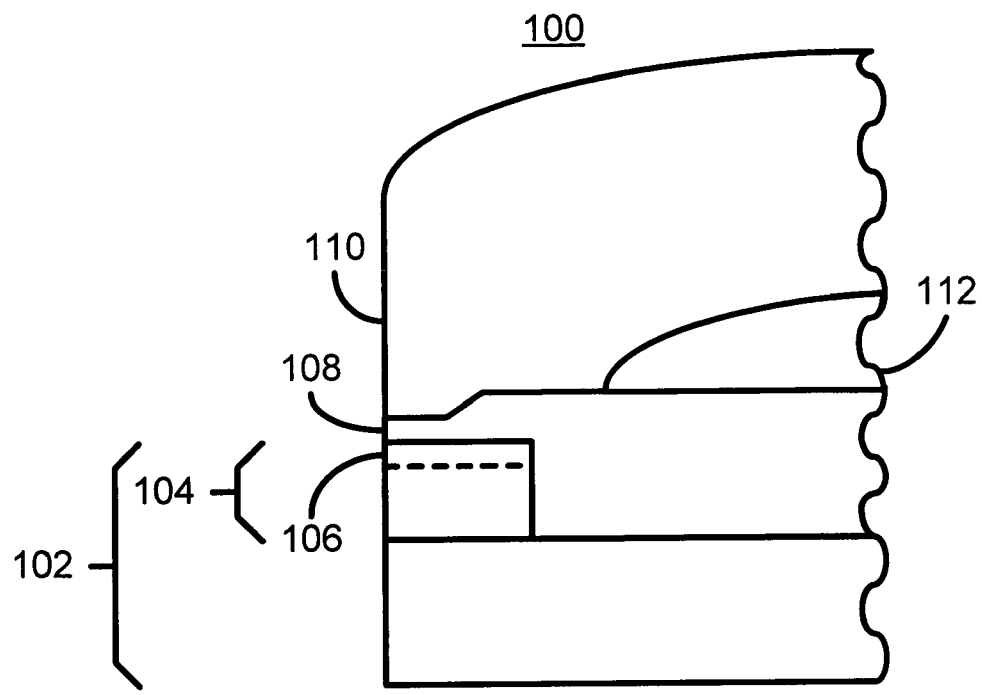
FIG. 4A is a side view of one embodiment a portion of a PDZT head in accordance with the present invention.
Figure 4B:
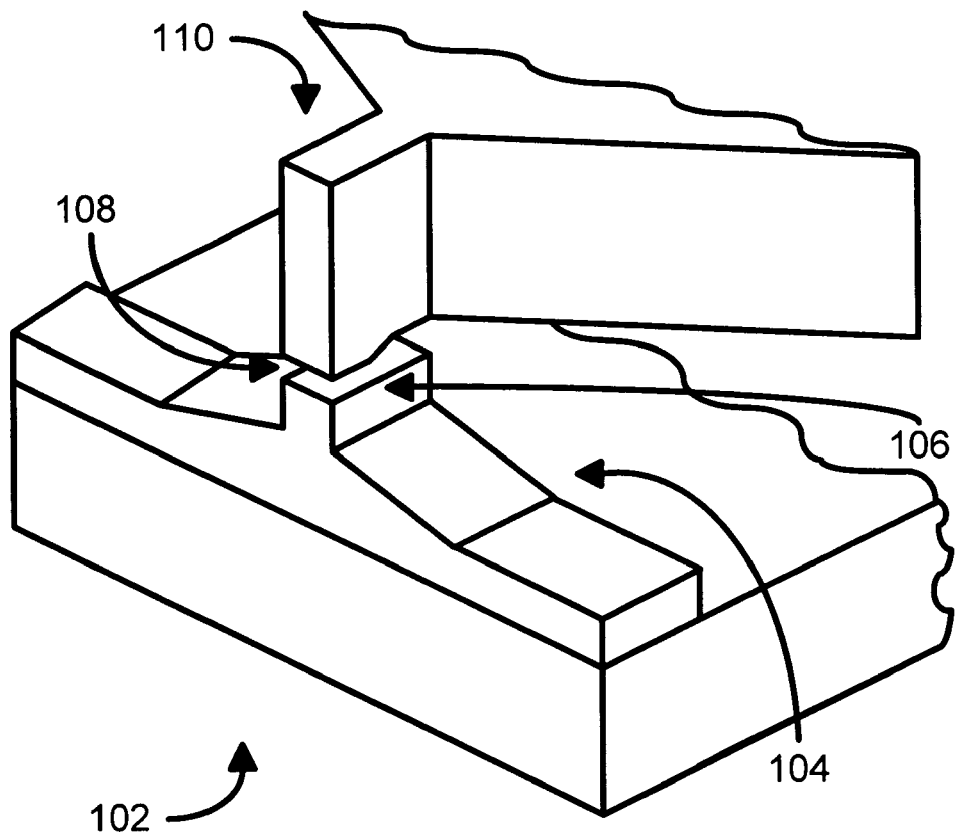
FIG. 4B is a perspective view of one embodiment of a portion of a PDZT head in accordance with the present invention.

To more particularly illustrate the method and system in accordance with the present invention, refer now to FIGS. 4A and 4B, depicting side and perspective views of a portion of one embodiment of a PDZT head 100 in accordance with the present invention. The PDZT head 100 includes a first pole (P1) 102 having a pedestal 104, a gap 108, a second pole (P2) 110 and a hardbake layer 112. The hardbake layer 112 preferably insulates a plurality of coils (not shown). The pedestal 104 includes a notch 106. The notch is formed using the P2 110 as a shadow mask.

The gap 108 has two different thicknesses. Thus, the gap 108 can be considered to be a dual gap. Near the front of the PDZT head 100, in proximity to the air bearing surface, a first portion of the gap 108 is thinner than a second portion of the gap 108 at the back of the pedestal 104. In the embodiment shown in FIGS. 4A and 4B, the second portion of the gap 108 is thicker because the P2 110 is recessed. In a preferred embodiment, the first portion of the gap 108 is approximately one thousand Angstroms thick, while the second portion of the gap 108 is approximately one thousand seven hundred Angstroms thick. Also in a preferred embodiment, the P2 110 is recessed by approximately seven hundred Angstroms. Because the gap 108 is thinner near the front of the PDZT head 100, the intensity of the field at the gap 108 that is used to write to the media (not shown) is preserved. Because the back of the gap 108 is thicker, the intensity of the fringe field at the back of the notch 106 is reduced. The reduction of the field can be seen using Ampere's law, using a loop that passes through the gap 108 at the front of the PDZT head 100, through the P2 110, through the gap 108 at the back of the pedestal 104 and through the pedestal 104 result in the equation:

$$H_1 = H_2(t_2/t_1)$$

Where:
$H_1$ = field at the gap at the back of the pedestal 104
$H_2$ field at the front of the pedestal 104
$t_1$ = thickness of the gap 108 at the back of the pedestal 104
$t_2$ = thickness of the gap 108 at the front of the pedestal 104

Because the thickness, $t_1$, of the gap 108 at the back of the pedestal 104 is larger than the thickness of the gap 108 at the front 107, the field H1 at the back of the pedestal 104 is reduced. As a result, the notch 106 is less likely to be saturated. Consequently, the PDZT head 100 is less likely to write to adjacent tracks. Moreover, because the notch 106 is formed using the P2 110 shadow mask, the PDZT head 100 still has improved writeability and control of the track width.

Figure 5A:
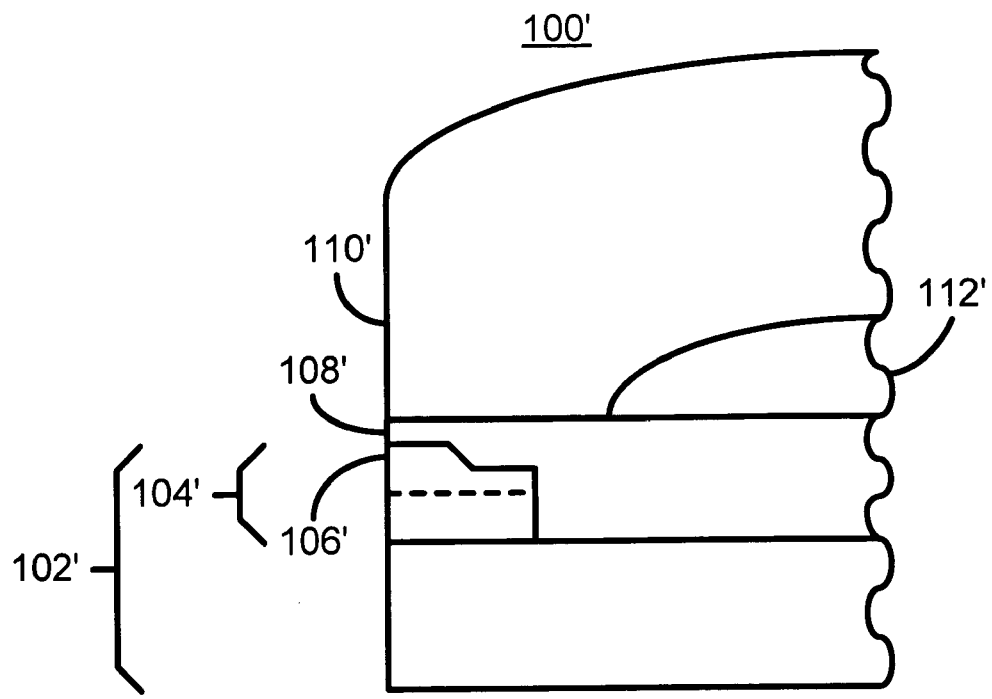
FIG. 5A is a side view of a second embodiment a portion of a PDZT head in accordance with the present invention.
Figure 5B:
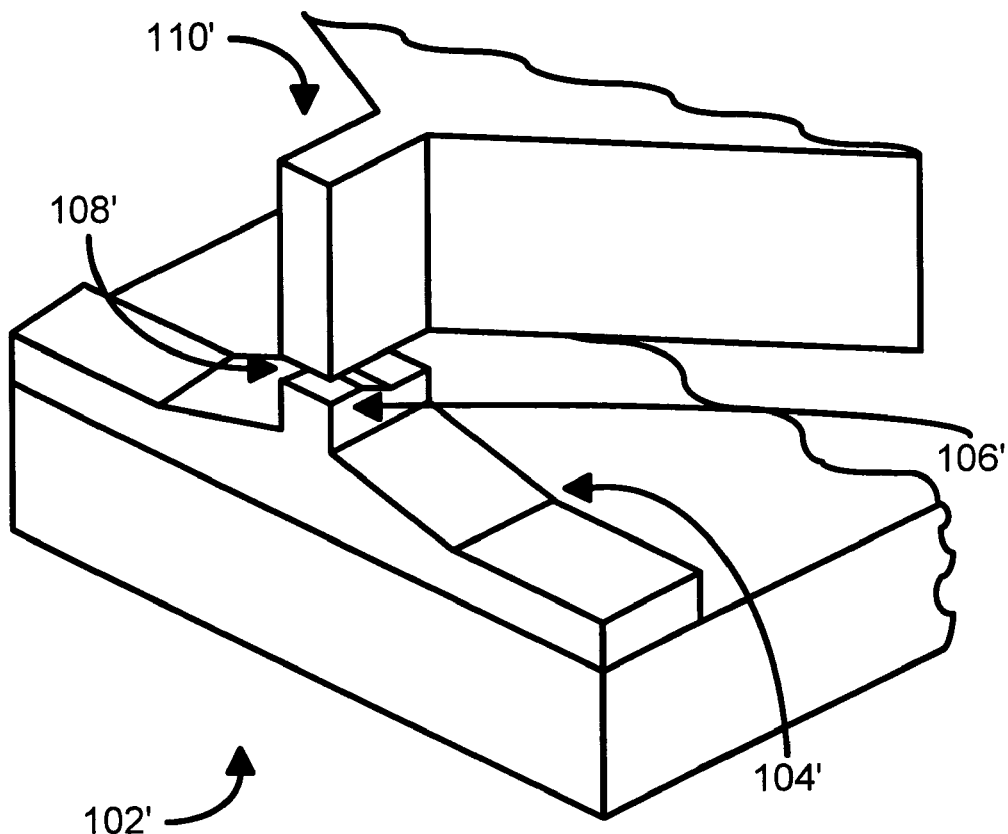
FIG. 5B is a perspective view of the second embodiment of a portion of a PDZT head in accordance with the present invention.

FIGS. 5A and 5B, respectively, depict perspective and side views, respectively of a portion of a second embodiment of a PDZT head 100' in accordance with the present invention. Many of the components of the PDZT head 100' are analogous to the PDZT head 100. Consequently, portions of the PDZT head 100' are labeled similarly. For example, the PDZT head 100 includes a gap 108, while the PDZT head 100' includes a gap 108'. The gap 108' has a first portion near the front of the PDZT head 100' and a second, thicker portion at the back of the pedestal 104'. In the second embodiment of the PDZT head 100', the gap 108' is thicker at the back of the pedestal 104' because the pedestal 104' is recessed near the back of the pedestal 104'. In a preferred embodiment, the first portion of the gap 108' is approximately one thousand Angstroms thick, while the second portion of the gap 108' is approximately one thousand seven hundred Angstroms thick. Also in a preferred embodiment, the pedestal 104' is recessed by approximately seven hundred Angstroms.

As discussed above with respect to FIGS. 4A and 4B, in the PDZT head 100' shown in FIGS. 5A and 5B the magnetic field at the back of the pedestal 104', in the second portion of the gap 108', is reduced. As a result, the notch 106' is less likely to be saturated. Consequently, the second embodiment of the PDZT head 100' is less likely to erase adjacent tracks. Furthermore, because the notch 106' is formed using the P2 110 shadow mask, the PDZT head 100 still has improved writeability and control of the track width.

Figure 6A:
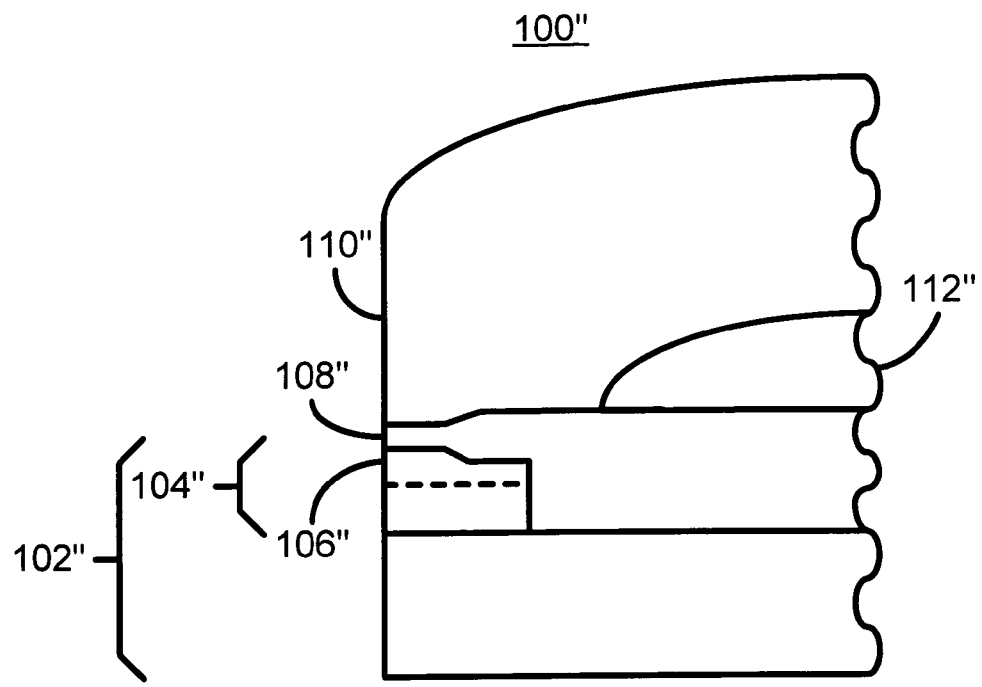
FIG. 6A is a side view of a third embodiment a portion of a PDZT head in accordance with the present invention.
Figure 6B:
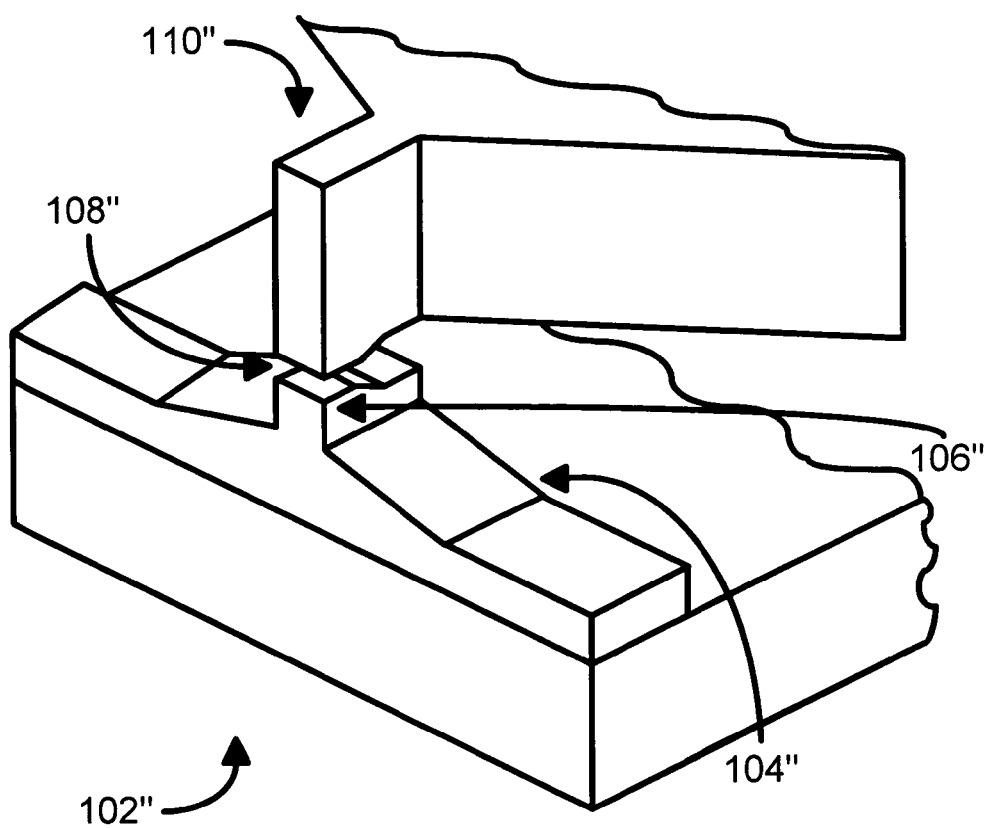
FIG. 6B is a perspective view of the third embodiment of a portion of a PDZT head in accordance with the present invention.

FIGS. 6A and 6B, respectively, depict perspective and side views, respectively of a portion of a third embodiment of a PDZT head 100" in accordance with the present invention. Many of the components of the PDZT head 100" are analogous to the PDZT head 100. Consequently, portions of the PDZT head 100" are labeled similarly. For example, the PDZT head 100 includes a gap 108, while the PDZT head 100" includes a gap 108". The gap 108" has a first portion near the front of the PDZT head 100" and a second, thicker portion at the back of the pedestal 104". In the second embodiment of the PDZT head 100", the gap 108" is thicker at the back of the pedestal 104" because both the pedestal 104" and P2 110" are recessed near the back of the pedestal 104". In a preferred embodiment, the first portion of the gap 108" is approximately one thousand Angstroms thick, while the second portion of the gap 108" is approximately one thousand seven hundred Angstroms thick. Also in a preferred embodiment, the pedestal 104" and the P2 110" are each recessed by approximately three hundred fifty Angstroms.

For the same reasons as discussed with respect to FIGS. 4A and 4B, in the PDZT head 100" shown in FIGS. 6A and 6B the magnetic field at the back of the pedestal 104", in the second portion of the gap 108", is reduced. As a result, the notch 106" is less likely to be saturated. Consequently, the second embodiment of the PDZT head 100" is less likely to erase adjacent tracks. Furthermore, because the notch 106" is formed using the P2 110" shadow mask, the PDZT head 100" still has improved writeability and control of the track width.

Figure 7A:
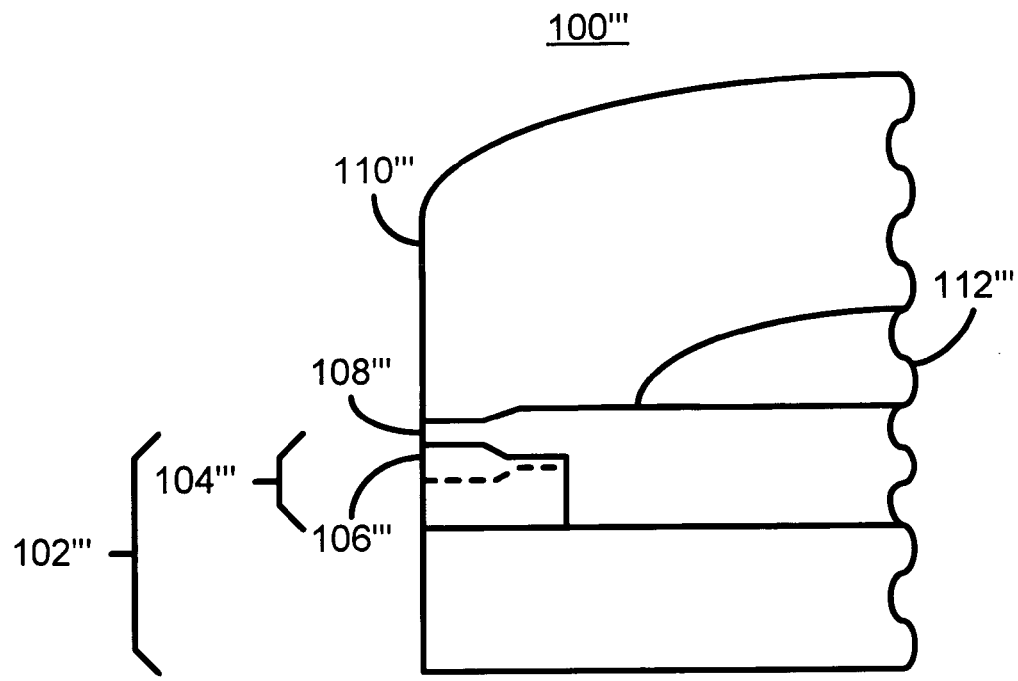
FIG. 7A is a side view of a fourth embodiment a portion of a PDZT head in accordance with the present invention.
Figure 7B:
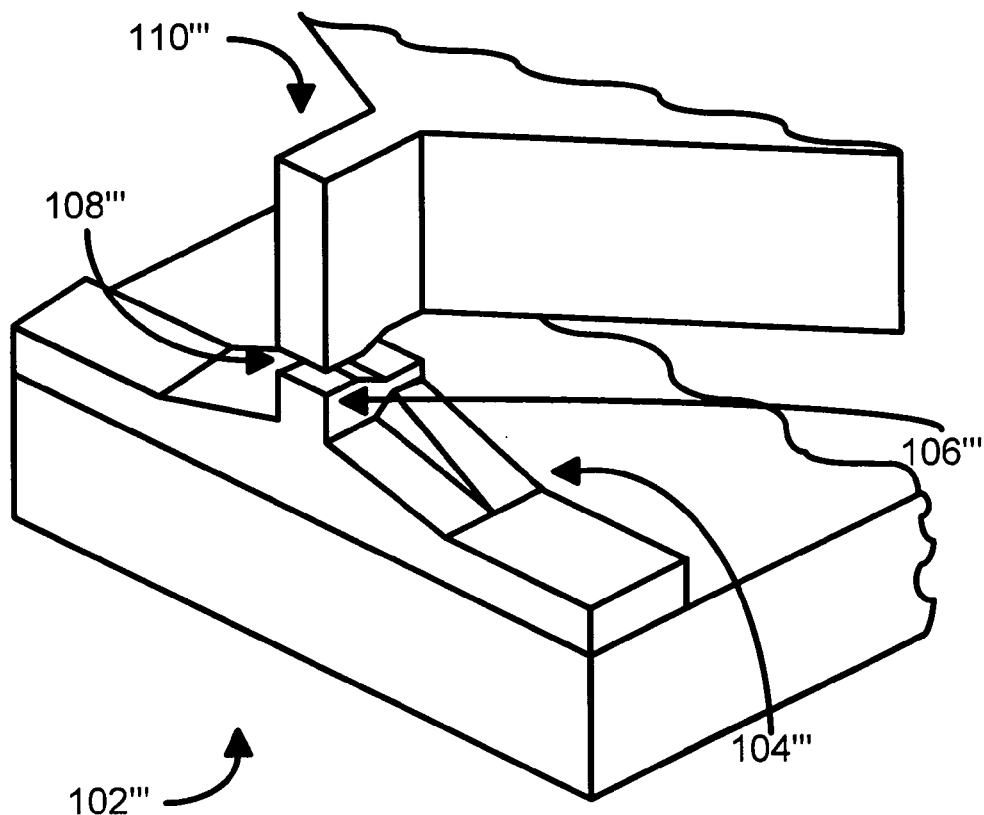
FIG. 7B is a perspective view of the fourth embodiment of a portion of a PDZT head in accordance with the present invention.

FIGS. 7A and 7B, respectively, depict perspective and side views, respectively of a portion of a third embodiment of a PDZT head 100''' in accordance with the present invention. Many of the components of the PDZT head 100''' are analogous to the PDZT head 100. Consequently, portions of the PDZT head 100''' are labeled similarly. For example, the PDZT head 100 includes a gap 108, while the PDZT head 100''' includes a gap 108'''. The gap 108''' has a first portion near the front of the PDZT head 100''' and a second, thicker portion at the back of the pedestal 104'''. In the second embodiment of the PDZT head 100''', the gap 108''' is thicker at the back of the pedestal 104''' because both the pedestal 104''' and P2 110''' are recessed near the back of the pedestal 104'''. In a preferred embodiment, the first portion of the gap 108''' is approximately one thousand Angstroms thick, while the second portion of the gap 108''' is approximately one thousand seven hundred Angstroms thick. Also in a preferred embodiment, the pedestal 104''' and the P2 110''' are each recessed by approximately three hundred fifty Angstroms.

For the same reasons as discussed with respect to FIGS. 4A and 4B, in the PDZT head 100''' shown in FIGS. 7A and 7B the magnetic field at the back of the pedestal 104''', in the second portion of the gap 108''', is reduced. Because the gap 108''' is thicker at the back than at the front of the pedestal 104''' in the PDZT head 100''' shown in FIGS. 7A and 7B the magnetic field at the back of the pedestal 104''', in the second portion of the gap 108''', is reduced. Moreover, the notch 106''' is not completely milled through the pedestal 104'''. As a result, the notch 106''' is thinner at the back of the pedestal 104''' than at the front. As a result, there is even more area for magnetic flux from the P2 106''' to P1 102''' to spread. The magnetic field at the back of the notch 106''' is further reduced. As a result, the notch 106''' is less likely to be saturated. Consequently, the third embodiment of the PDZT head 100''' is less likely to erase adjacent tracks. Moreover, because the notch 106''' is formed using the P2 110''' shadow mask, the PDZT head 100''' still has improved writeability and control of the track width.

Figure 8A:
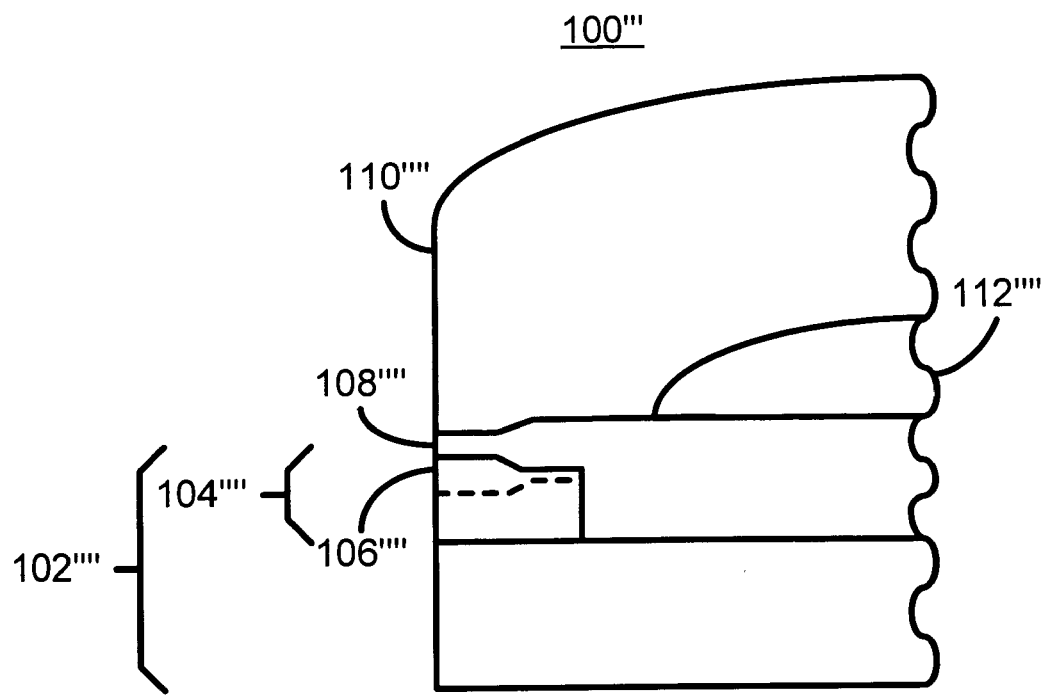
FIG. 8A is a side view of a fifth embodiment a portion of a PDZT head in accordance with the present invention.
Figure 8B:
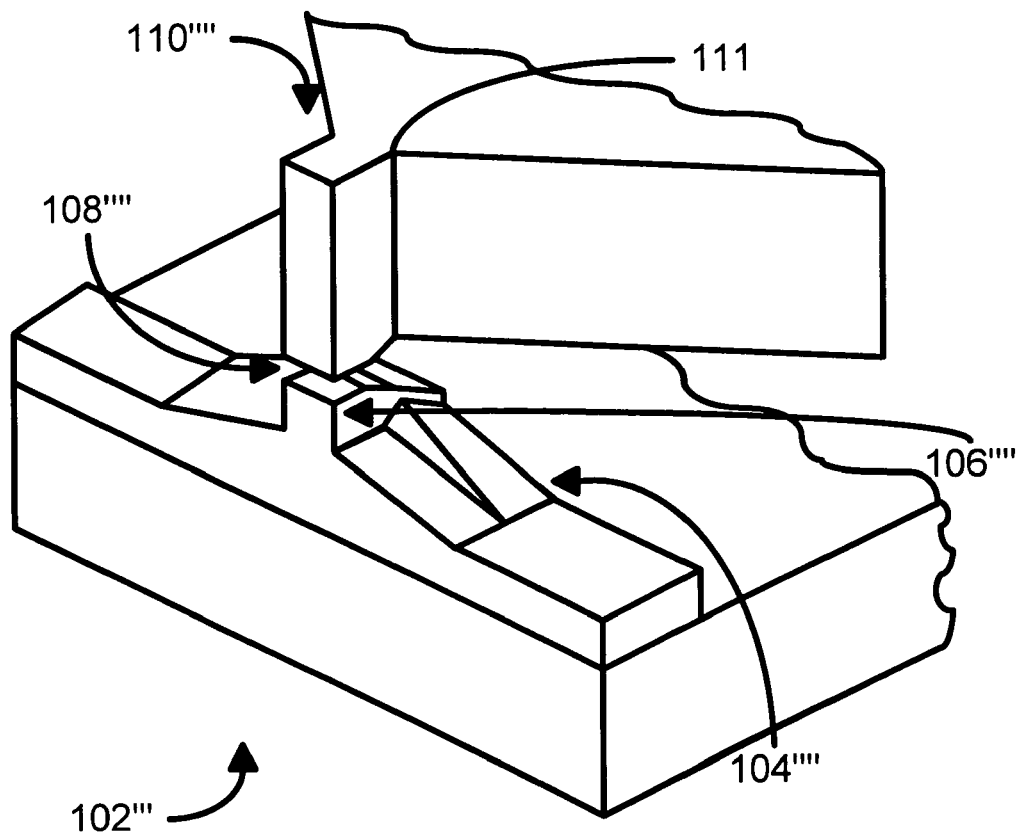
FIG. 8B is a perspective view of the fifth embodiment of a portion of a PDZT head in accordance with the present invention.

FIGS. 8A and 8B, respectively, depict perspective and side views, respectively of a portion of a fourth embodiment of a PDZT head 100'''' in accordance with the present invention. Many of the components of the PDZT head 100'''' are analogous to the PDZT head 100. Consequently, portions of the PDZT head 100'''' are labeled similarly. For example, the PDZT head 100 includes a gap 108, while the PDZT head 100'''' includes a gap 108''''. The gap 108'''' has a first portion near the front of the PDZT head 100'''' and a second, thicker portion at the back of the pedestal 104''''. In the third embodiment of the PDZT head 100'''', the gap 108'''' is thicker at the back of the pedestal 104'''' because both the pedestal 104'''' and P2 110'''' are recessed near the back of the pedestal 104''''. In a preferred embodiment, the first portion of the gap 108'''' is approximately one thousand Angstroms thick, while the second portion of the gap 108'''' is approximately one thousand seven hundred Angstroms thick. Also in a preferred embodiment, the pedestal 104'''' and the P2 110'''' are each recessed by approximately three hundred fifty Angstroms.

Because the second portion of the gap 108'''' is thicker, the magnetic field in the second portion of the gap 108'''', is reduced. Because the gap 108'''' is thicker at the back than at the front of the pedestal 104'''' in the PDZT head 100'''' the magnetic field at the back of the pedestal 104'''', in the second portion of the gap 108'''', is reduced. Moreover, the notch 106'''' is not completely milled through the pedestal 104''''. As a result, the notch 106'''' is thinner at the back of the pedestal 104'''' than at the front. In addition, the shoulders 111 of the P2 110'''' have been moved forward. The shoulders 111 thus shadow part of the pedestal 104'''' during formation of the notch 106''''. As a result, the notch 106'''' is wider at the back than at the front. As a result, there is even more area for magnetic flux from the P2 106'''' to P1 102'''' to spread. The magnetic field at the back of the notch 106'''' is further reduced. As a result, the notch 106'''' is less likely to be saturated. Consequently, the third embodiment of the PDZT head 100'''' is less likely to erase adjacent tracks. Moreover, because the notch 106'''' is formed using the P2 110'''' shadow mask, the PDZT head 100'''' still has improved writeability and control of the track width.

Figure 9:
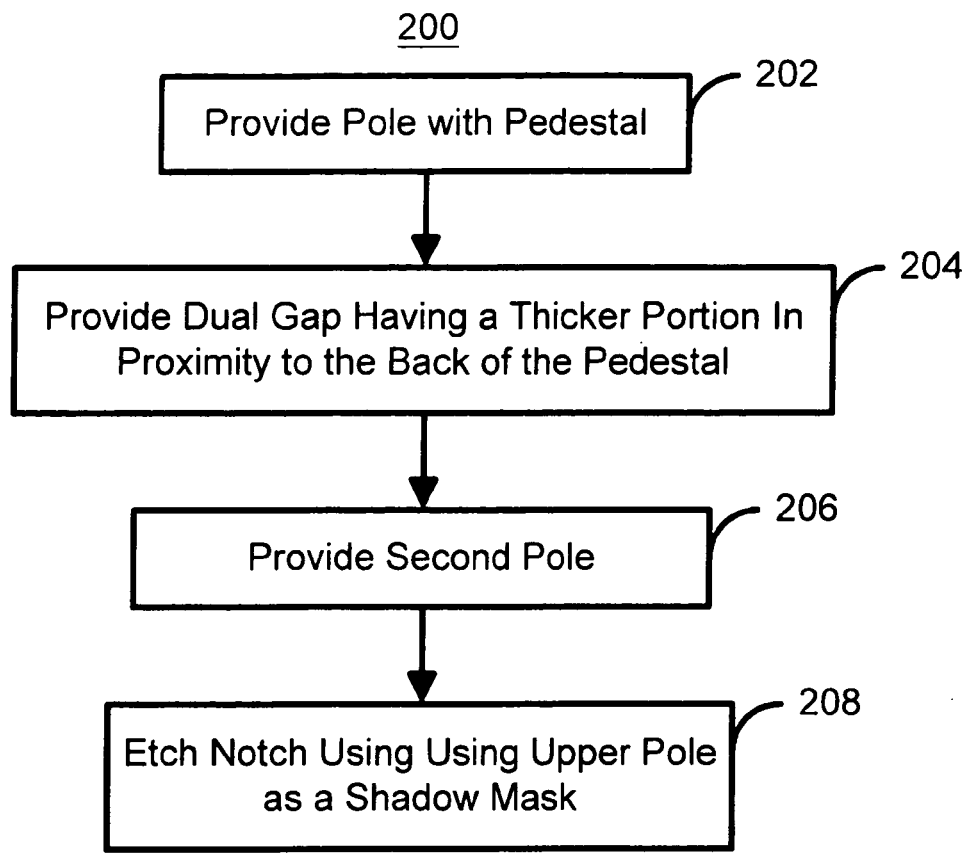
FIG. 9 is a high level flow-chart of one embodiment of a method for providing a PDZT head in accordance with the present invention.

FIG. 9 is a high level flow-chart of one embodiment of a method 200 for providing a PDZT head 100, 100', 100", 100''' or 100'''' in accordance with the present invention. The first pole, P1, with a pedestal is provided, via step 202. Step 202 includes depositing the bottom portion of the pole, depositing the pedestal and adjacent insulator and performing a chemical mechanical polish (CMP) to planarize the PDZT head and set the height of the pedestal. A gap in accordance with the present invention is then provided, via step 204. The gap provided in step 204 has two portions. The first portion of the gap is near the front of the pedestal at the air bearing surface, while the second portion of the gap is near the back of the pedestal. Step 204 also includes ensuring that the second portion of the gap is thicker than the first portion of the gap. In a preferred embodiment, the second portion of the gap is approximately seven hundred Angstroms thicker than the first portion of the gap. The second pole, P2, is provided on the gap, via step 206. A notch is then etched into the pedestal of P1 using P2 as a shadow mask, via step 208. In some embodiments, depicted in FIGS. 7A, 7B, 8A and 8B, a low milling material may be used for the pedestal. When milling the notch in step 208, therefore, the pedestal may not be completely milled through. Moreover, the shoulders of the P2 can also be moved forward. The notch milled in step 208 will thus be wider at the back, as shown in the fifth embodiment depicted in FIGS. 8A and 8B. After milling of the notch, processing of the PDZT head can then be completed.

Figure 10:
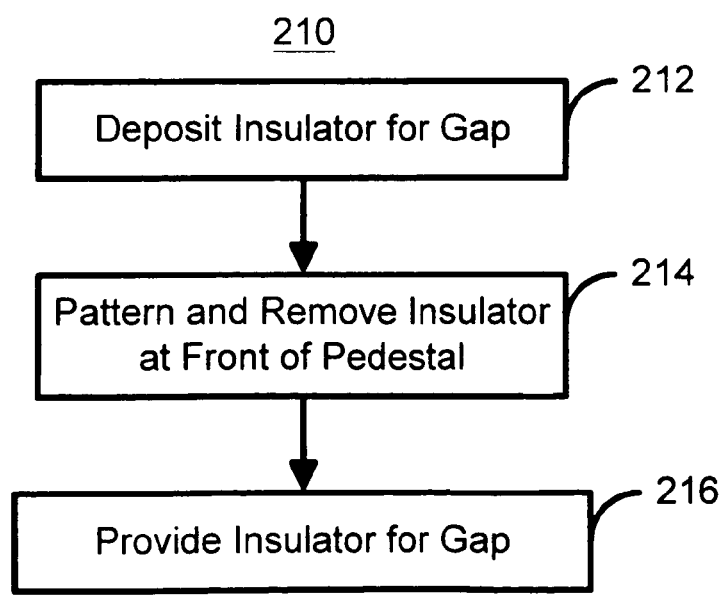
FIG. 10 is a flow chart of a method for providing a gap for the first embodiment of a PDZT head in accordance with the present invention.

FIG. 10 is a high-level flow chart of a method 210 for providing a gap for the PDZT head in accordance with the present invention. The method 210 can be used for providing the step 204 of the method 200, for example when fabricating the first embodiment of the PDZT head 100 shown in FIGS. 4A and 4B. Referring back to FIG. 10, gap material, typically alumina, is deposited, via step 212. In a preferred embodiment, step 212 includes providing the layer of gap material that is preferably approximately seven hundred Angstroms. A portion of the gap material near the front of the pedestal is then removed, via step 214. Seven hundred Angstroms is preferably removed in step 214. A standard gap, preferably one thousand Angstroms in thickness, is then deposited, via step 216. As a result, the gap will be thinner in the front than in the back. Once step 216 is completed, the P2 can be provided. Thus, as depicted in FIGS. 4A and 4B, the P2 will be recessed due to the thicker pack portion of the gap.

Figure 11:
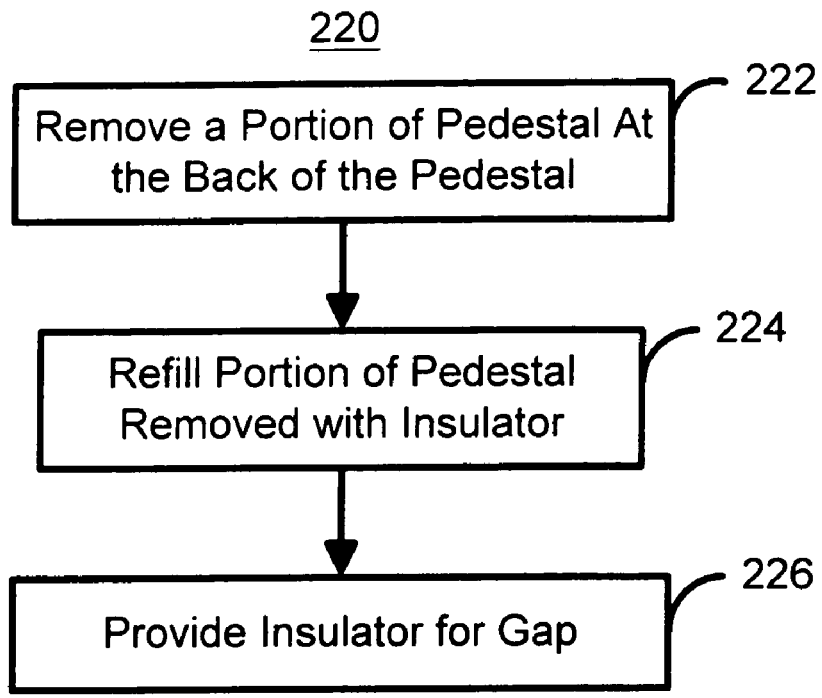
FIG. 11 is a flow chart of a method for providing a gap for the second embodiment of the PDZT head in accordance with the present invention.

FIG. 11 is a high-level flow chart of a method 220 for providing a gap for the PDZT head in accordance with the present invention. The method 220 can be used for providing the step 204 of the method 200, for example when fabricating the second embodiment of the PDZT head 100' shown in FIGS. 5A and 5B. Referring back to FIG. 11, a portion of the pedestal at the back is milled or otherwise removed, via 222. In a preferred embodiment, step 222 includes removing approximately seven hundred Angstroms of the pedestal. The area from which the pedestal material was removed is then refilled with an insulator such as alumina, via step 224. Thus, seven hundred Angstroms of insulator are provided in step 224. A standard gap, preferably one thousand Angstroms in thickness, is then deposited, via step 226. As a result, the gap will be thinner in the front than in the back. Once step 226 is completed, the P2 can be provided. Thus, as depicted in FIGS. 5A and 51B, the P1 will be recessed due to the thicker pack portion of the gap.

Figure 12:
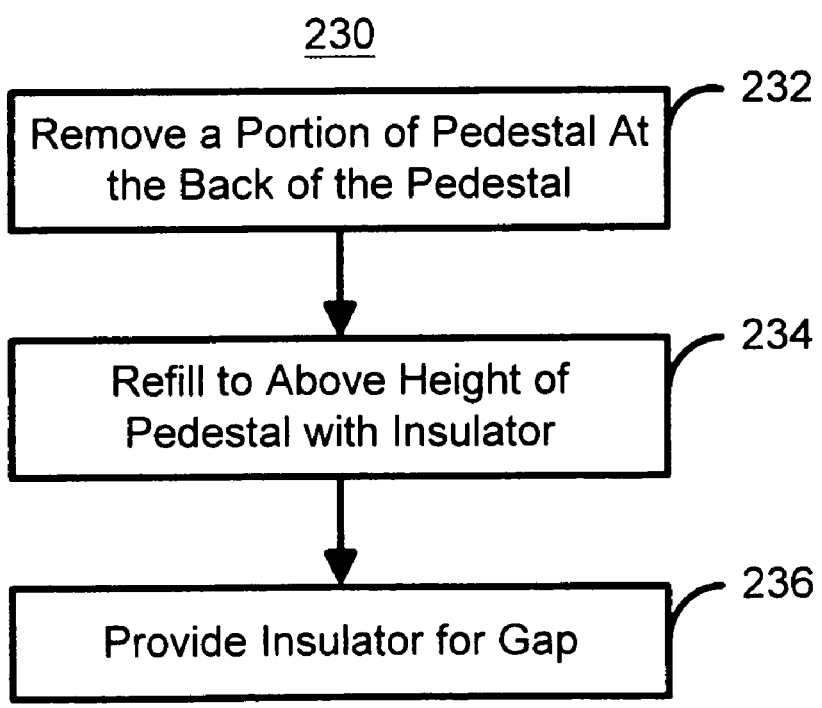
FIG. 12 is a flow chart of a method for providing a gap for the third, fourth and fifth embodiments of the PDZT head in accordance with the present invention.

FIG. 12 is a flow chart of a method 230 for providing a gap for the third, fourth and fifth embodiments of the PDZT head in accordance with the present invention. The method 230 is preferably used for providing the step 204 of the method 200 when fabricating the third, fourth or fifth embodiments of the PDZT head 100", 100''' and 100'''', respectively, shown in FIGS. 6A and 6B, FIGS. 7A and 7B and FIGS. 8A and 8B, respectively. Referring back to FIG. 12, a portion of the pedestal at the back is milled or otherwise removed, via 232. In a preferred embodiment, step 232 includes removing approximately three hundred and fifty Angstroms of the pedestal. An insulator, preferably having twice the thickness of the amount of the pedestal removed, is then provided, via step 234. Seven hundred Angstroms of insulator are preferably provided in step 234. The insulator provided in step 234 is provided only over the area in which the pedestal was removed. A standard gap, preferably one thousand Angstroms in thickness, is then deposited, via step 236. As a result, the gap will be thinner in the front than in the back. Once step 226 is completed, the P2 can be provided. Thus, as depicted in FIGS. 6A, 6B, 7A, 7B, 8A and 8B, the P1 and P2 will be recessed due to the thicker pack portion of the gap. In a preferred embodiment, the P1 and the P2 are recessed approximately the same amount.

Thus, the present invention provides a PDZT head having a gap with a thickness at the front of the head that is less than the thickness of the gap at the back of the pedestal. As a result, the notch in the pedestal is less likely to become saturated. Thus, the PDZT head may not erase adjacent tracks. Furthermore, because the notch in the pedestal can be formed using the P2 as a shadow mask, the writeability and track width control for the PDZT head may be improved.

A method and system has been disclosed for providing an improved spin-dependent tunneling sensor. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A pedestal defined zero throat write head comprising:
   a first pole having a pedestal, the pedestal including a notch, the notch having a front and a back;
   a second pole;
   a gap separating the notch of the first pole from a portion of the second pole, the gap having a first portion and a second portion, the first portion of the gap being between the front of the notch and the second pole, the second portion of the gap being between the back of the notch and the second pole, the first portion of the gap being thinner than the second portion of the gap;
   wherein the second portion of the gap has a top and a bottom, the top of the second portion of the gap being substantially parallel to the bottom of the second portion of the gap.

2. pedestal defined zero throat write head comprising:
   a first pole having a pedestal, the pedestal including a notch, the pedestal having a front and a back;
   a second pole;
   a gap separating the notch of the first pole from a portion of the second pole, the gap having a first portion and a second portion, the first portion of the gap being in proximity to the front of the pedestal, the second portion of the gap being in proximity to the back of the pedestal, the first portion of the gap being thinner than the second portion of the gap;
   wherein the second portion of the gap has a top and a bottom, the top of the second portion of the gap being substantially parallel to the bottom of the second portion of the gap;
   wherein the notch further includes a top along the gap, the top of the notch being recessed along the second portion of the gap.

3. A pedestal defined zero throat write head comprising:
   a first pole having a pedestal, the pedestal including a notch, the pedestal having a front and a back;

a second pole;

a gap separating the notch of the first pole from a portion of the second pole, the gap having a first portion and a second portion, the first portion of the gap being in proximity to the front of the pedestal, the second portion of the gap being in proximity to the back of the pedestal, the first portion of the gap being thinner than the second portion of the gap;

wherein the second portion of the gap has a top and a bottom, the top of the second portion of the gap being substantially parallel to the bottom of the second portion of the gap;

wherein the second pole includes a bottom interface along the gap, the bottom of the second pole being recessed along the second portion of the gap.

4. A pedestal defined zero throat write head comprising:

a first pole having a pedestal, the pedestal including a notch, the pedestal having a front and a back;

a second pole;

a gap separating the notch of the first pole from a portion of the second pole, the gap having a first portion and a second portion, the first portion of the gap being in proximity to the front of the pedestal, the second portion of the gap being in proximity to the back of the pedestal, the first portion of the gap being thinner than the second portion of the gap;

wherein the second portion of the gap has a top and a bottom, the top of the second portion of the gap being substantially parallel to the bottom of the second portion of the gap;

wherein the notch further includes a top along the gap and the second pole includes a bottom along the gap, the top of the notch and the bottom of the second pole being recessed at the second portion of the gap.

5. The pedestal defined zero throat write head of claim 4 wherein the notch has a first height near the front of the pedestal and a second height near the back of the pedestal, the second height being less than the first height.

6. The pedestal defined zero throat write head of claim 4 wherein the notch has a first width near the front of the pedestal and a second width near the back of the pedestal, the first width being less than the second width.

7. A pedestal defined zero throat write head comprising:

a first pole having a pedestal, the pedestal including a notch, the pedestal having a front and a back;

a second pole;

a gap separating the notch of the first pole from a portion of the second pole, the gap having a first portion and a second portion, the first portion of the gap being in proximity to the front of the pedestal, the second portion of the gap being in proximity to the back of the pedestal, the first portion of the gap being thinner than the second portion of the gap;

wherein the second portion of the gap has a top and a bottom, the top of the second portion of the gap being substantially parallel to the bottom of the second portion of the gap;

wherein the first portion of the gap has a first top and wherein the top of the second portion of the gap is substantially parallel to the first top.

8. The pedestal defined zero throat write head of claim 1 wherein the first portion of the gap has a first bottom and wherein the bottom of the second portion of the gap is parallel to the first bottom.

\* \* \* \* \*